United States Patent
Peng (10) Patent No.: US 12,417,059 B2
(45) Date of Patent: Sep. 16, 2025

(54) METHOD AND APPARATUS FOR SPLIT-SCREEN DISPLAY, ELECTRONIC DEVICE AND COMPUTER READABLE STORAGE MEDIUM

(71) Applicant: BEIJING XIAOMI MOBILE SOFTWARE CO., LTD., Beijing (CN)

(72) Inventor: Cong Peng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 121 days.

(21) Appl. No.: 17/977,989

(22) Filed: Oct. 31, 2022

(65) Prior Publication Data

US 2024/0036790 A1 Feb. 1, 2024

(30) Foreign Application Priority Data

Jul. 29, 2022 (CN) .......................... 202210908242.5

(51) Int. Cl.
  *G06F 3/14* (2006.01)
  *G06F 3/0484* (2022.01)

(52) U.S. Cl.
  CPC .............. *G06F 3/14* (2013.01); *G06F 3/0484* (2013.01); *G06F 2203/04803* (2013.01)

(58) Field of Classification Search
  CPC . G06F 3/14; G06F 3/0484; G06F 2203/04803
  See application file for complete search history.

(56) References Cited

U.S. PATENT DOCUMENTS

| | | | |
|---|---|---|---|
| 2011/0107272 A1* | 5/2011 | Aguilar | G06F 3/04883 345/173 |
| 2014/0189566 A1* | 7/2014 | Kim | G06F 3/013 715/773 |
| 2014/0195953 A1* | 7/2014 | Sakai | G06F 3/017 715/771 |
| 2015/0378557 A1* | 12/2015 | Jeong | G06F 3/04886 715/835 |
| 2018/0232139 A1* | 8/2018 | Okuda | G06F 3/04886 |
| 2019/0310882 A1* | 10/2019 | Wei | G06F 9/4881 |
| 2021/0342050 A1* | 11/2021 | Wang | G06F 3/0486 |
| 2023/0403458 A1* | 12/2023 | Liu | H04N 23/57 |

FOREIGN PATENT DOCUMENTS

| CN | 111371950 A | * | 7/2020 |
|---|---|---|---|
| WO | 2021104030 A1 | | 6/2021 |

OTHER PUBLICATIONS

Extended European Search Report of EP Application No. 22204733.4 dated Jul. 11, 2023, (9p).

* cited by examiner

*Primary Examiner* — Jeanette J Parker
(74) *Attorney, Agent, or Firm* — Arch & Lake LLP (57) ABSTRACT

A method and an apparatus for split-screen display including: displaying a first interface of a first application in a first split-screen area, displaying a second interface of a second application in a second split-screen area different from the first split-screen area, in response to a start instruction for a split-screen function; displaying a third interface in the second split-screen area, displaying the first interface of the first application in the first split-screen area, in response to a first operation on the second interface. The third interface is independent from the second application.

17 Claims, 8 Drawing Sheets

METHOD AND APPARATUS FOR SPLIT-SCREEN DISPLAY, ELECTRONIC DEVICE AND COMPUTER READABLE STORAGE MEDIUM

CROSS-REFERENCE TO RELATED APPLICATION

This application is based on and claims priority to the Chinese Patent Application No. 202210908242.5, filed on Jul. 29, 2022, the entire content of which is incorporated herein by reference for all purposes.

BACKGROUND

With the popularity of large-screen terminals such as folding screen mobile phones and tablet computers, a split-screen display function is embedded in various terminal devices to provide users with a better experience.

In related technologies, after the terminal enters a split-screen display mode, different split-screen areas display interfaces of different applications, and the interfaces displayed in different split-screen areas interact with each other. It is difficult to achieve display decoupling between different split-screen areas.

SUMMARY

The present disclosure relates to the field of terminals, especially a method and an apparatus for split-screen display, an electronic equipment and a storage medium.

A method for split-screen display, including: displaying a first interface of a first application in a first split-screen area, displaying a second interface of a second application in a second split-screen area, in response to a start instruction for a split-screen function, in which the second split-screen area is different from the first split-screen area; displaying a third interface in the second split-screen area, displaying the first interface of the first application in the first split-screen area, in response to a first operation on the second interface, in which the third interface is independent from the second application.

An electronic device, including: a processor; and a memory configured to store instructions executable by the processor; in which the processor is configured to: display a first interface of a first application in a first split-screen area, displaying a second interface of a second application in a second split-screen area, in response to a start instruction for a split-screen function, in which the second split-screen area is different from the first split-screen area; and display a third interface in the second split-screen area, displaying the first interface of the first application in the first split-screen area, in response to a first operation on the second interface, in which the third interface is independent from the second application.

A non-transitory computer-readable storage medium having stored therein instructions that, when executed by a processor of a mobile terminal, causes the mobile terminal to perform a method for split-screen display as mentioned above.

BRIEF DESCRIPTION OF THE DRAWINGS

The drawings herein are incorporated into the specification and constitute a part of the specification, show examples in conformity with the present disclosure, and explain the principle of the present disclosure together with the specification.

DETAILED DESCRIPTION

The example embodiments will be described in detail here, and examples thereof are shown in the accompanying drawings. When the accompanying drawings are referred to in the following descriptions, unless otherwise indicated, the same numbers in different drawings represent the same or similar elements. The implementations described in the following illustrative embodiments do not represent all implementations consistent with the disclosure. Rather, they are merely examples of apparatuses and methods consistent with some aspects of the present disclosure as detailed in the appended claims.

The terms described in the present disclosure are only for the purpose of describing specific embodiments and are not intended to limit the present disclosure. The singular forms "an", "said" and "the" are also intended to include a plural form, unless the context clearly indicates otherwise. It should also be understood that the term "and/or" used in the present disclosure means and includes any or all possible combinations of one or more associated listed items.

It should be understood that, although the terms first, second, third, etc. may be used in this disclosure to describe various information, such information shall not be limited to these terms. These terms are only used to distinguish the same type of information from each other. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determination".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In related technologies, after entering a split-screen display mode, a terminal device usually displays interfaces of different applications in different split-screen areas.

However, in an actual process of split-screen display, there is a problem that the interfaces displayed in different split-screen areas interact with each other in related technologies, and it is difficult to achieve decoupling between different split-screen areas.

Specifically, after entering the split-screen display mode, only when each split-screen area starts an application, the corresponding interface may be displayed. If any of the split-screen areas do not start an application, the other split-screen areas may not display an interface of a started program, which brings a poor using experience in many cases.

For example, after a folding screen mobile phone enters the split-screen display mode, it is usually divided into two split-screen areas, a right area and a left area. On this basis, two applications may be started in the right area and the left area respectively to present the corresponding interfaces. However, when the user needs to switch the application started in the right area, once the application currently started in the right area is closed, the application started in the left area will also be switched to a thumbnail or a suspension window, etc., and may not continue to be displayed in the form of the interface. The application displayed in a form of a thumbnails or a suspension window, etc. may not be switched to the interface in the left area until an application is started in the right area.

In addition, because an operating system in the related technology does not allow a same application to run repeatedly, in the split-screen display mode, there is a problem that the same application may not run respectively in different split-screen areas. It is difficult to meet the requirements of users to log in different accounts in the same application started in different split-screen areas.

For this reason, the present disclosure proposes a method for split-screen display to avoid the problem of mutual influence of display between different split-screen areas in the related technologies.

Figure 1:
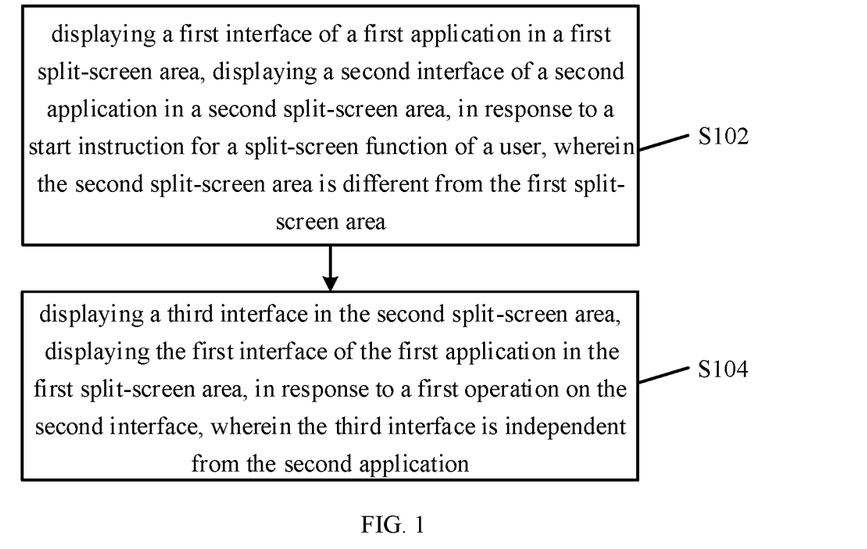
FIG. 1 is a flowchart illustrating a method for split-screen display according to an example of the present disclosure.

FIG. 1 is a flowchart illustrating a method for split-screen display according to an example. As illustrated in FIG. 1, the method may include the following steps.

At S102, a first interface of a first application is displayed in a first split-screen area, a second interface of a second application is displayed in a second split-screen area, in response to a start instruction for the split-screen function. The second split-screen area is different from the first split-screen area.

In the present disclosure, after receiving the start instruction for the split-screen function, the screen may be divided into several split-screen areas. At least one split-screen area is determined as the first split-screen area to display the first interface of the first application, while the remaining split-screen areas are determined as the second split-screen areas to display the second interface of the second application.

According to the present disclosure, in response to the first operation on the second interface being received, the interface displayed in the second split-screen area may be switched to a third interface that does not belong to the second application, while the first interface of the first application displayed in the first split-screen area is remained. Therefore, according to the present disclosure, when the content of one split-screen area is to be switched, contents displayed in other split-screen areas do not need to be converted to a thumbnail form as in the related technologies. It is necessary to note that the first operation in the present disclosure may be different in different scenarios. For example, it may be a cancel operation for the second interface, or an exit operation. For example, it may be a hidden operation for the second interface. For example, it may be a switch operation which switches the second interface to an interface of other applications, which will not be limited here.

In fact, the above problems in related technologies are caused by the fact that a logic of the split-screen display is embedded in a system framework of an operating system. For example, a display logic of the split-screen display function has been constrained in the system framework of the Android system. Then, when a device deployed with the Android system needs to enter the split-screen display mode, it will call code of the split-screen display deployed in the system to split-screen display different applications. The logic of the split-screen display constrained by the Android system is as described in the example of the folding screen mobile phone above.

In view of this, the present disclosure no longer relies on the logic of the split-screen display deployed in the operating system to realize the split-screen function, so as to avoid the above problem of mutual influence of display between different split-screen areas.

For example, in the present disclosure, when the split-screen function is started and the display interface is divided into the first split-screen area and the second split-screen area, a corresponding subsystem may also be created for the first split-screen area. On this basis, the terminal may run the first application on the subsystem and display the first interface of the first application in the first split-screen area.

For example, according to the present disclosure, the application displayed in the first split-screen area runs independently on the subsystem created, so that the application running on the subsystem is not subject to the logic of the split-screen constrained by the main system (i.e., the above operating system). On this basis, the decoupling between applications displayed in different split-screen areas may be realized, so that the mutual influence of display between different split-screen areas above is avoided. For example, the user may continuously switch the applications displayed in the second split-screen area different from the first split-screen area when the application in the first split-screen area is continuously operated.

In the present disclosure, the applications may run on the created subsystem in a variety of ways.

In one example, after the first split-screen area is determined and the subsystem is created for it, the user may initiate the start instruction for the first application to run the first application on the subsystem, and display its interface in the first split-screen area. For example, after divided into multiple split-screen areas, each split-screen area may display several program icons. Then, the user may click any program icon in the first split-screen area to run the first application corresponding to any program icon based on the subsystem. This example is merely illustrative, those skilled in the art may determine specifically how to start the application program in the subsystem after the subsystem is created according to actual requirements, which is not limited here.

In another example, the application running on a main system may be switched to the subsystem, in response to the subsystem being created. For example, when the main system is running one application, the user may perform a second operation on the program icon or interface of the application. For example, the program icon or the interface may be dragged out of the screen with three fingers. On the one hand, it indicates to enable the split-screen function to perform the above operations of determining the first split-screen area and creating subsystems. On the other side, it indicates to switch the application to run on the subsystem created, and to display the interface of the application in the first split-screen area. This example is merely illustrative, those skilled in the art may determine specifically how to switch the application running on the main system to the subsystem according to the actual requirements, which is not limited here.

In the present disclosure, in addition to displaying the applications running on the subsystem in the first split-screen area, the second interface of the second application running on the main system may also be displayed in the second split-screen area other than the first split-screen area. It should be understood that since the first application displayed in the first split-screen area is running on the subsystem in the present disclosure, the main system does not need to interfere with a program operation of the first application. Therefore, the main system may achieve the split-screen display function without relying on the logic of the split-screen display embedded, and merely need to run the application normally in a conventional mode, which avoids many constraints of the logic of the split-screen display embedded on the split-screen display.

In the present disclosure, the number of split-screen areas obtained by dividing the screen may be large. Accordingly, the first split-screen areas determined from the divided split-screen areas may also be multiple. In other words, the first split-screen areas determined may include at least two.

In this case, independent subsystems may be created for the multiple first split-screen areas determined. On this basis, each subsystem may run an application independently, and interfaces of running applications may be displayed in the first split-screen areas correspondingly. In other words, after the division of the screen, if altogether N split-screen areas, then independent subsystems may be created for each of the M split-screen areas. On this basis, the M split-screen areas may include the first split-screen area described above, the M split-screen areas do not include the second split-screen area described above. The second split-screen areas are included in the N-M split-screen areas. Each subsystem created may run an application independently, and interfaces of running applications are displayed in the M split-screen areas correspondingly, and N, M are positive integers, N≥2, N>M≥1.

For example, if the first split-screen areas A and B are determined, then subsystem a corresponding to the first split-screen area A and subsystem b corresponding to the first split-screen area B may be created. The interface of the application running on subsystem a may be displayed in the first split-screen area A, and the interface of the application running on subsystem b may be displayed in the first split-screen area B.

It should be noted that the subsystem created corresponding to the first split-screen area in the disclosure refers to an independent system that may run in parallel with the operating system (i.e., the main system) mounted on the device. From the perspective of operation logic, the subsystem itself may also be regarded as an independent operating system, or as a virtual system created in the main system, or as a virtual thread to meet the requirements of parallel operation with the main system. In practical applications, technicians may preset a condition in the code under which the subsystem operates, and once an operating state of the device satisfies the condition, the operation of the subsystem may be triggered. For example, the condition may be that the split-screen function is started. When the split-screen function is detected to be started, corresponding code may be run to create the subsystem, which may be used to run the application independently. A specific form of the above-mentioned subsystem and the condition for the operation of the subsystem are illustrative. The specific form of the subsystem and the condition under which the subsystem is operated may be determined by those skilled in the art according to an actual situation, which are not limited herein.

In the present disclosure, it may be determined in a variety of ways whether or not the start instruction for the split-screen function is detected.

In one example, a start widget of the split-screen function may be displayed on the screen. Once the start widget of the split-screen function is triggered, it may be determined that the start instruction for the split-screen function is detected.

In another example, a second operation is set to be bound to the split-screen function. Once the second operation is detected, it is determined that the start instruction for the split-screen function is detected. In the example, different second operations may be set according to actual requirements. For example, the second operation may be a preset floating gesture operation, such as sliding over the screen, etc. For example, the second operation may be a sliding operation along a preset track, such as a circle, three fingers sliding in a specific direction, etc. For example, the second operation may be a click operation in a preset form, such as a double click, a percussion, etc. How to specifically set the second operation is not limited herein.

At S104, a third interface is displayed in the second split-screen area, the first interface of the first application is displayed in the first split-screen area, in response to a first operation on the second interface. The third interface is independent from the second application.

In the present disclosure, the user may need to lock the application displayed in the first split-screen area to avoid program switching and other problems caused by mis-touching. Therefore, a lock identifier may be added to the first split-screen area displaying the interface of the application, to make the subsystem created only run the application. For example, when the interface is displayed in the first split-screen area, a lock widget may be further displayed. If the lock widget is triggered, the subsystem is locked to merely run the first application currently started. This example is merely illustrative, those skilled in the art may determine specifically how to switch the application running on the main system to the subsystem according to the actual requirements, which is not limited here.

In the present disclosure, the positions of the first split-screen area and the second split-screen area may be exchanged, so as to adapt to usage habits of different users or the same user in different situations. For example, when it is detected that the user drags the first split-screen area to the second split-screen area, or drags the second split-screen area to the first split-screen area, it may be determined that the exchange instruction is detected. At this time, the positions of the first split-screen area and the second split-screen area may be exchanged.

In the disclosure, it is likely that content input is required in a certain interface. At this time, an input widget may be displayed in the screen so that the user may input content. In this case, the split-screen area corresponding to the input widget may be determined, and a prompt for the split-screen area may be displayed. The input widget may be any form of input widget, such as a keyboard, a virtual handle, etc. The prompt may be displayed as any type of highlighting, adding a specific logo, etc., which is not limited herein.

It is necessary to state that the executive body of the technical solution in the present disclosure may be any type of electronic devices. For example, the electronic device may be a mobile terminal such as a smart phone, a tablet computer, or a fixed terminal such as a smart TV, a PC (Personal Computer). It should be understood that only electronic devices equipped with screens and applications may be used as electronic devices in the disclosure. Specifically, those skilled in the art may determine which type of electronic devices may be used as the executive body of the technical solution in the disclosure according to the actual requirements, which is not limited here.

In the technical solution of the present disclosure, after the split-screen function is started, the first interface of the first application may be displayed in the first split-screen area, while the second interface of the second application may be displayed in the second split-screen area. After receiving the first operation of the second interface, the third interface which is independent from the second application may be displayed in the second split-screen area, while the display of the first interface may be maintained in the first split-screen area. It can be seen that the display of the first split-screen area in the present disclosure is not affected by the second split-screen area, which realizes the decoupling between different split-screen areas and avoids the mutual influence of display contents between different split-screens in the related technologies.

For example, the present disclosure may also create a subsystem corresponding to the first split-screen area. On this basis, the first application runs on the subsystem and the interface of the first application is displayed in the first screen area. It should be understood that by creating a subsystem, the application displayed in the first split-screen area may run independently. On this basis, because the application corresponding to the interface displayed in the first split-screen area is not limited by the logic of the split-screen display of the main system, the mutual influence of display contents between the first split-screen area and the second split-screen area is avoided, and the display decoupling between different split-screen areas is achieved.

For example, the applications displayed in the second split-screen area may be continuously switched, while the application displayed in the first split-screen area is kept unchanged. For example, the same application may run on the main system and the subsystem respectively to display the same application in the first split-screen area and the second split-screen area, so as to realize a requirement of logging different accounts in the same application displayed in different split-screen areas.

In the following, a folding screen mobile phone is taken as an example to introduce the method for the split-screen display of the present disclosure.

Figure 2:
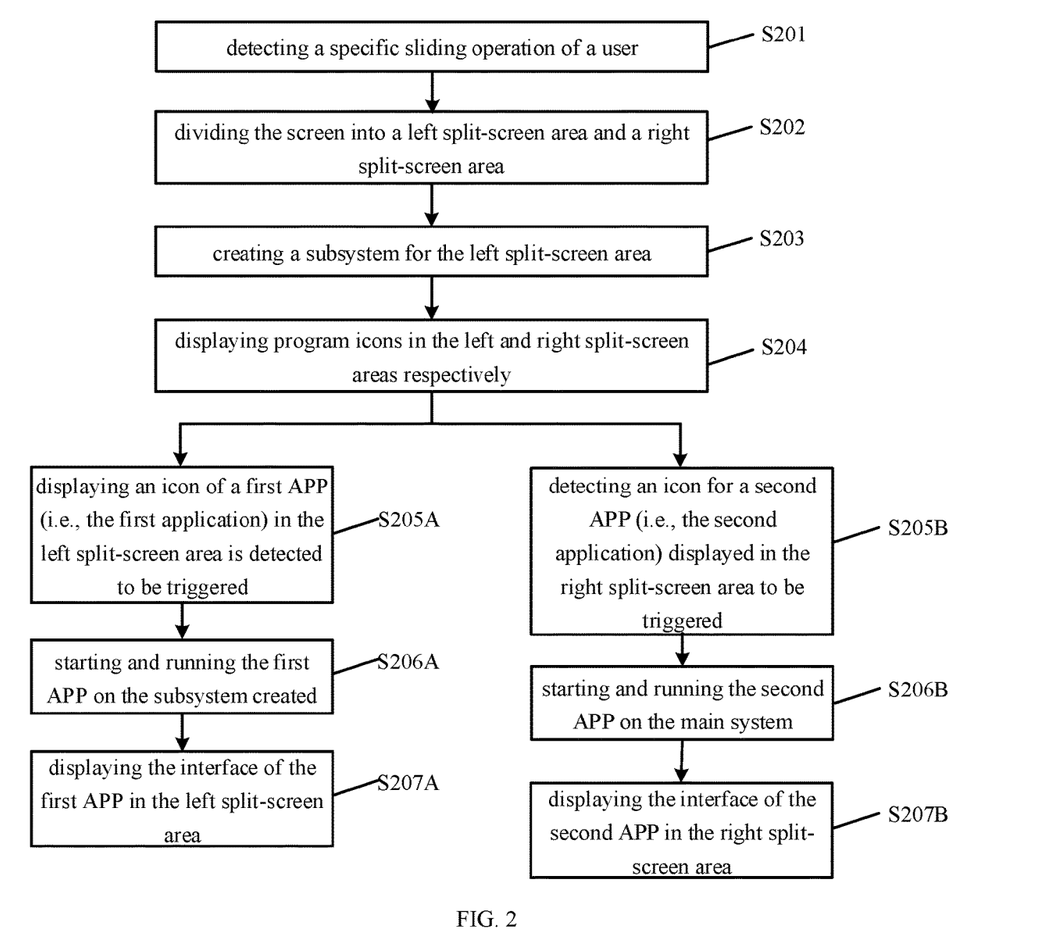
FIG. 2 is a flowchart illustrating a method for split-screen display according to another example of the present disclosure.

FIG. 2 is a flowchart illustrating a method for split-screen display according to another example. As illustrated in FIG. 2, the method may include the following steps.

At S201, a specific sliding operation is detected.

Figure 3:
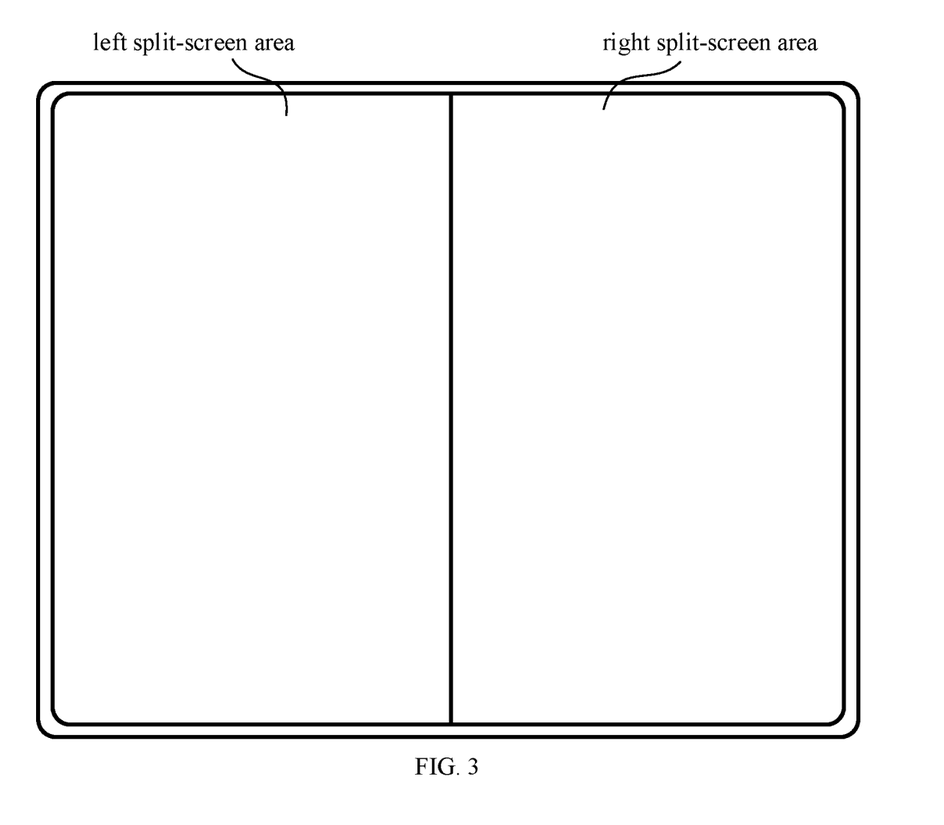
FIG. 3 is a schematic diagram of a folding screen mobile phone in split-screen display according to a first example of the present disclosure.

In the example, the binding relationship between a specific sliding gesture and a split-screen function may be preset in the folding screen mobile phone. Assuming that the specific sliding gesture is a three-finger sliding, the split-screen function may be started to divide a main screen along a middle line into a left split-screen area and a right split-screen area as shown in FIG. 3, when the three-finger sliding operation on the main screen of the folding screen mobile phone is detected.

At S202, the screen is divided into a left split-screen area and a right split-screen area.

At S203, a subsystem for the left split-screen area is created.

In the example, after dividing the main screen into the left split-screen area and the right split-screen area, the subsystem corresponding to the left split-screen area may be created to run an application displayed in the left split-screen area.

It should be noted that although the above description describes the case the subsystem corresponding to the left split-screen area is created after the screen is divided, in the practice, the subsystem may be created and then the subsystem is bound to the left split-screen area. It should be understood that the purpose of the split-screen function in the disclosure is that the application displayed in a certain split-screen area runs independently on a separate subsystem. The disclosure does not concern whether to "preferentially create a subsystem and then bind it to a certain split-screen area", or "create a subsystem for a certain split-screen area based on the division of multiple split-screen areas". Those skilled in the art may set it according to actual requirements, and is not limited in the disclosure.

At S204, program icons are displayed in the left and right split-screen areas respectively.

Figure 4:
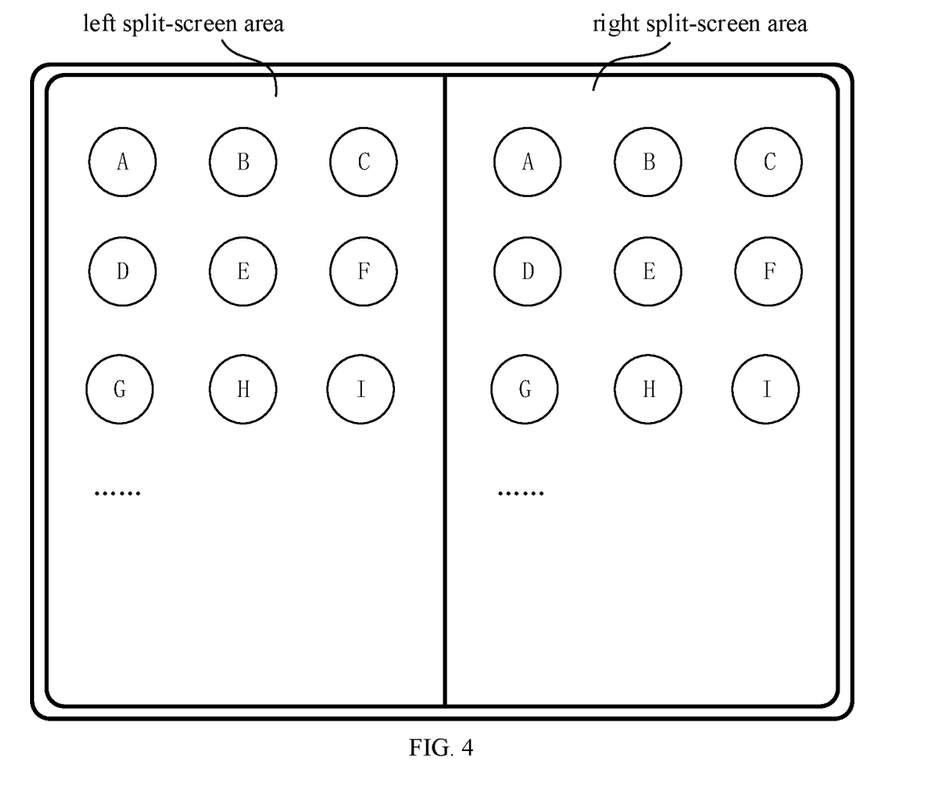
FIG. 4 is a schematic diagram of a folding screen mobile phone in split-screen display according to a second example of the present disclosure.

In this example, after the left and right split-screen areas are divided, the program icons (represented by a circular area and English letters in the figure) of the installed applications are displayed in the left and right split-screen areas as shown in FIG. 4. The interface is displayed in the corresponding split-screen area by triggering the program icon.

At S205A, an icon of a first APP (i.e., the first application) displayed in the left split-screen area is detected to be triggered.

In the example, the APP currently started in the left split-screen area may be the first APP. Then, when the icon for the first APP is detected to be triggered, the first APP may run in the subsystem created and the interface of the first APP is displayed in the left split-screen area.

At S206A, the first APP is started and runs on the subsystem created.

At S207A, the interface of the first APP is displayed in the left split-screen area.

At S205B, an icon for a second APP (i.e., the second application) displayed in the right split-screen area is detected to be triggered.

In the example, the APP currently started in the right split-screen area may be the second APP. Then, when the icon of the second APP is detected to be triggered, the second APP may run on the main system (i.e., an operating system of the folding screen mobile phone) and the interface of the second APP is displayed in the right split-screen area.

At S206B, the second APP is started and runs on the main system.

At S207B, the interface of the second APP is displayed in the right split-screen area.

Figure 5:
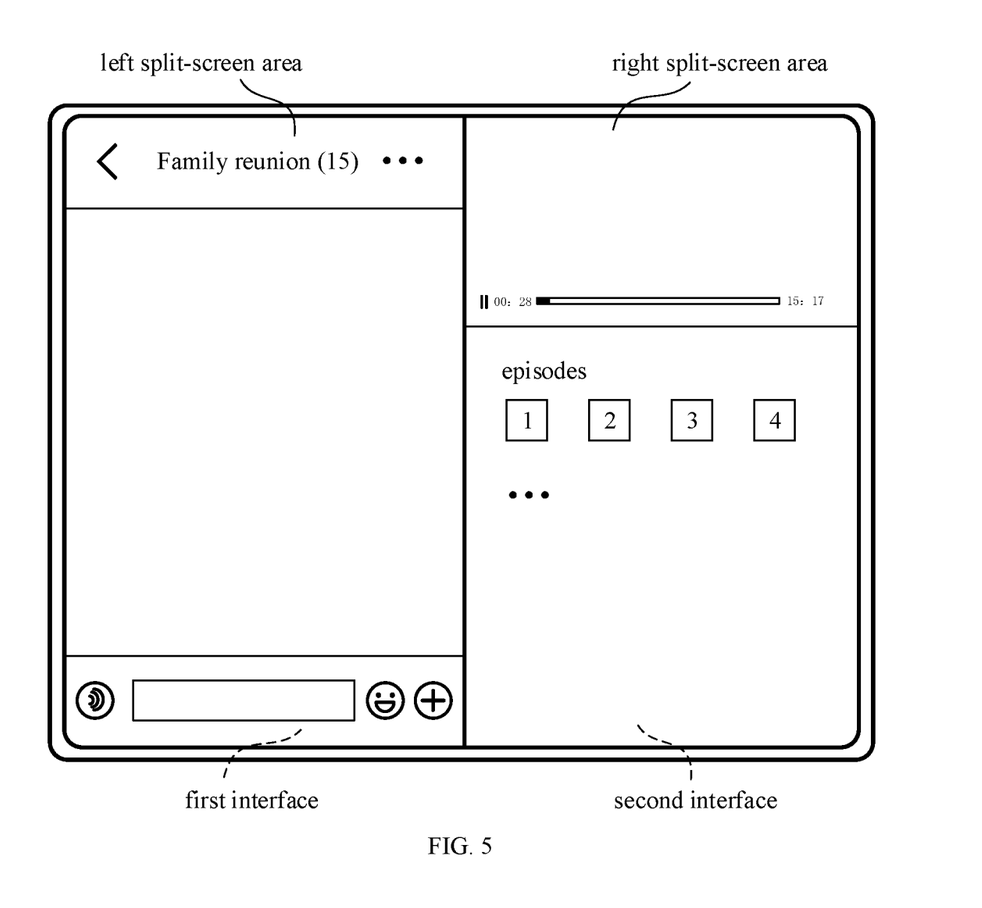
FIG. 5 is a schematic diagram of a folding screen mobile phone in split-screen display according to a third example of the present disclosure.
Figure 6:
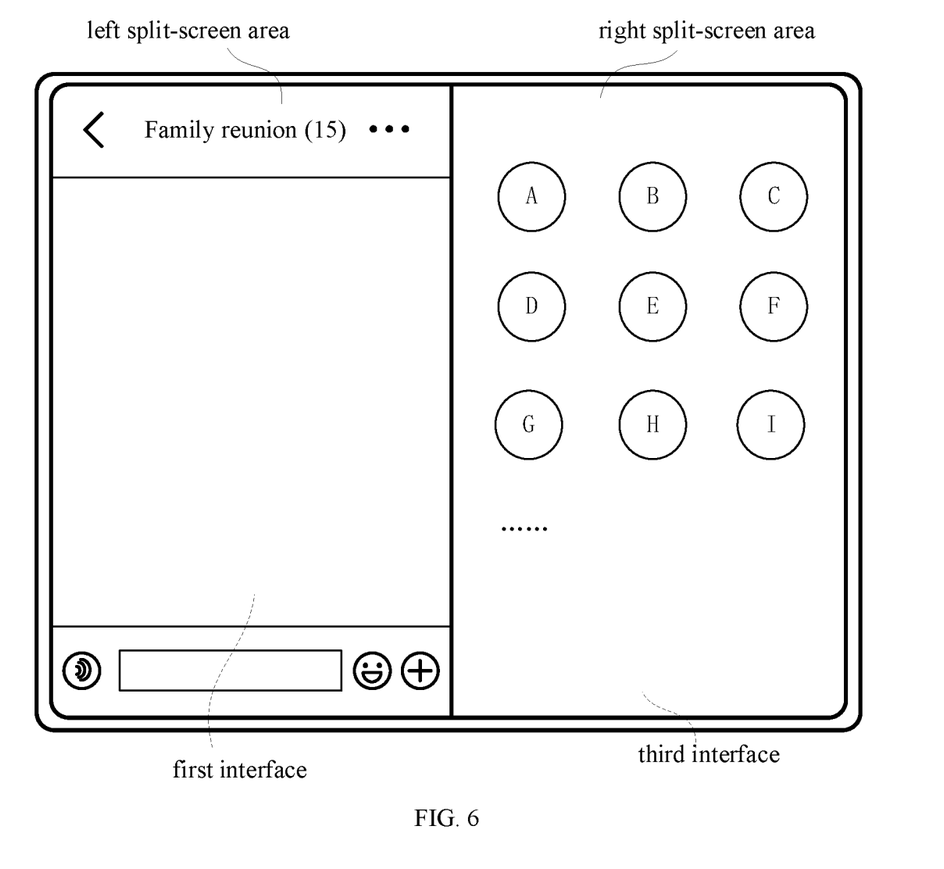
FIG. 6 is a schematic diagram of a folding screen mobile phone in split-screen display according to a fourth example of the present disclosure.
Figure 7:
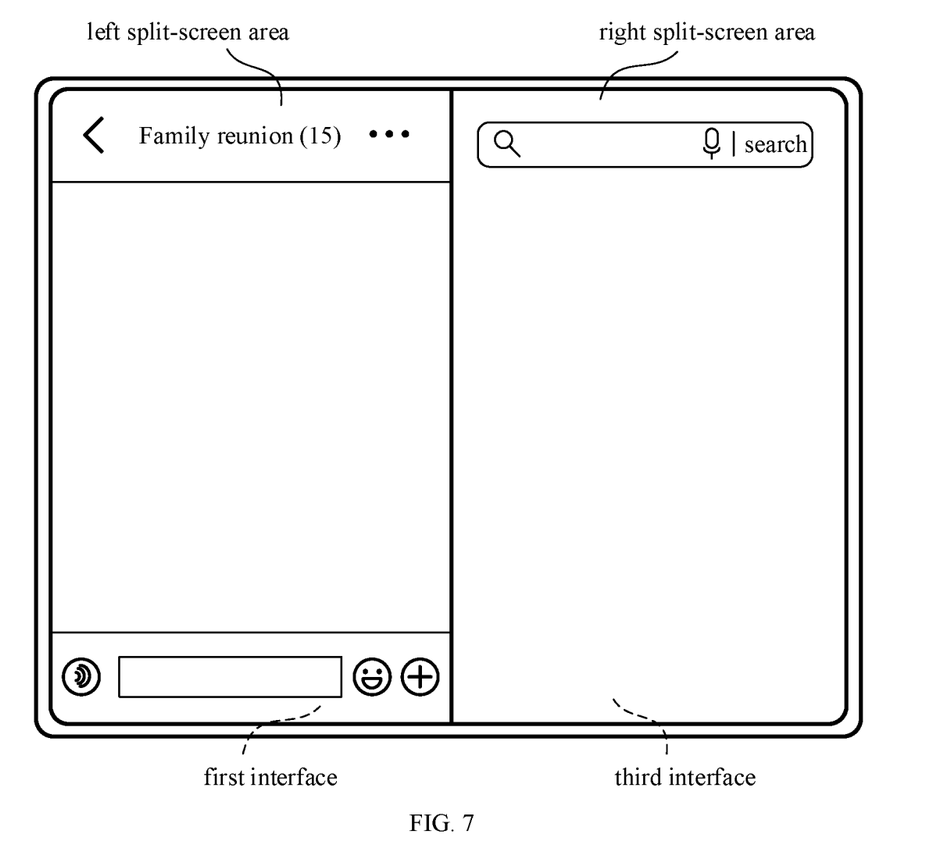
FIG. 7 is a schematic diagram of a folding screen mobile phone in split-screen display according to a fifth example of the present disclosure.

In the example, in the case that APPs are started in both the left and right split-screen areas, the interfaces displayed may be shown as FIG. 5. A first interface is the interface of the first APP, a second interface is the interface of the second APP, and they may be overlapped with the left and right split-screen areas respectively, as shown in FIG. 5. On this basis, the user may switch applications displayed in any of the split-screen areas at any time. For example, the user may close the second APP displayed in the right split-screen area. At this time, display status of the folding screen mobile phone may be as shown in FIG. 6, which is, the right split-screen area returns to a state of displaying icons, but the left split-screen area still displays the interface of the first APP. If the user further clicks on an icon of a third APP, the third APP may run on the main system, and the interface of the third APP may be displayed in the right split-screen area. At this time, the display status of the folding screen mobile phone may be as shown in FIG. 7. As shown in FIG. 7, the first interface and the third interface may be overlapped with the left and right split-screen areas respectively.

Similar to the right split-screen area, the example may ensure the continuous operation and display of the APP in the right split-screen area while the APP displayed in the left split-screen area is switched, which will not be repeated here.

It can be seen from the above technical solution that an independent subsystem may be created for one of the split-screen areas when the folding screen mobile phone enables the split-screen function in the technical solution of the example. On this basis, since the APP displayed in the split-screen area and that in other split-screen areas run in different systems, the decoupling between the APPs displayed in different split-screen areas is realized. Thereby the problem of mutual influence between the APPs displayed in different split-screen areas is avoided.

Figure 8:
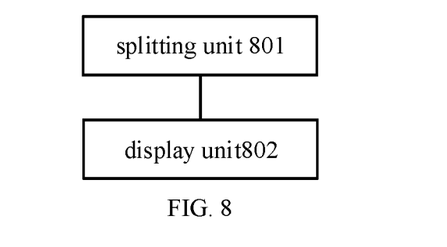
FIG. 8 is a block diagram of an apparatus for split-screen display according to an example of the present disclosure.

FIG. 8 is a block diagram of an apparatus for split-screen display according to example. Referring to FIG. 3, the apparatus 100 includes a splitting unit 801 and a display unit 802.

The splitting unit 801 is configured to display a first interface of a first application in a first split-screen area, and display a second interface of a second application in a second split-screen area different from the first split-screen area, in response to a start instruction for a split-screen function.

The display unit 802 is configured to display a third interface in the second split-screen area, and display the first interface of the first application in the first split-screen area, in response to a first operation on the second interface. The third interface is independent from the second application.

Optionally, the display unit 802 is further configured to display a prompt for the split-screen area corresponding to an input widget, in response to the input widget being displayed.

Figure 9:
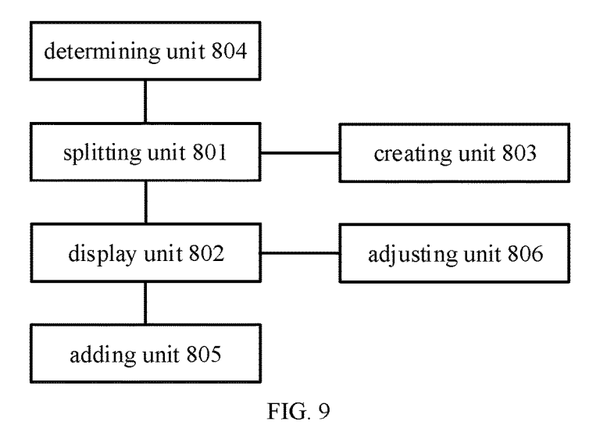
FIG. 9 is a block diagram of an apparatus for split-screen display according to another example of the present disclosure.

FIG. 9 is a block diagram of an apparatus for split-screen display according to another example. Based on the example illustrated in FIG. 8, the example in FIG. 9 also includes: a creating unit 803, a determining unit 804, an adding unit 805 and an adjusting unit 806.

Optionally, the example further includes the creating unit 803 configured to create a subsystem corresponding to the first split-screen area to run the first application based on the subsystem created.

Optionally, the creating unit 803 is further configured to run the second application based on a main system to display the second interface of the second application in the second split-screen area.

Optionally, the creating unit 803 is further configured to run the first application in the subsystem in response to the start instruction for the first application; or, to switch the first application running on a main system to the subsystem, in response to the subsystem being created.

Optionally, the creating unit 803 is further configured to create independent subsystems for M split-screen areas, in response to altogether N split-screen areas, the M split-screen areas include the first split-screen area, the M split-screen areas do not include the second split-screen area, and N, M are positive integers, N≥2, N>M≥1; each subsystem is configured to run an application individually, and interfaces of running applications are displayed in the M split-screen areas correspondingly.

Optionally, the example further includes the determining unit 804 configured to determine that the start instruction for the split-screen function is detected, in response to a start widget of the split-screen function displayed being triggered; or, to determine that the start instruction for the split-screen function is detected, in response to a second operation is detected.

Optionally, the second operation includes at least one of a preset floating gesture operation, a sliding operation along a preset track or a click operation in a preset form.

Optionally, the example further includes the adding unit 805 configured to add a lock identification to the first split-screen area displaying the first interface of the first application, to make the subsystem only run the first application.

Optionally, the example further includes an exchanging unit 806 configured to exchange positions of the first split-screen area and the second split-screen area, in response to receiving an exchange instruction to change positions of the first split-screen area and the second split-screen area.

Since the apparatus examples basically correspond to the method examples, please refer to part of descriptions of the method examples for relevant information. The apparatus examples described above are merely illustrative, in which the above units described as separate parts may or may not be physically separated, the parts shown as units may or may not be physical units, which may be located in one place, or may be distributed to multiple network units. Some or all of the modules may be selected according to actual requirements to achieve the solutions in the examples. Those skilled in the art may understand and implement the method without any creative effort.

Accordingly, the present disclosure also provides an apparatus for split-screen display, including: a processor; a memory for storing processor executable instructions. The processor is configured to implement a method for split-screen display as described in any one of the examples. For example, the method may include: displaying a first interface of a first application in a first split-screen area, displaying a second interface of a second application in a second split-screen area different from the first split-screen area, in response to a start instruction for a split-screen function;

displaying a third interface in the second split-screen area, displaying the first interface of the first application in the first split-screen area, in response to a first operation on the second interface. The third interface is independent from the second application.

Accordingly, the present disclosure also provides an electronic device. The electronic device includes a memory, and one or more programs. One or more programs are stored in the memory, and are configured to be executed by one or more processors to implement a method for split-screen display as described in any one of the above examples. For example, the method may include: displaying a first interface of a first application in a first split-screen area, displaying a second interface of a second application in a second split-screen area different from the first split-screen area, in response to a start instruction for a split-screen function; displaying a third interface in the second split-screen area, displaying the first interface of the first application in the first split-screen area, in response to a first operation on the second interface, The third interface is independent from the second application.

Figure 10:
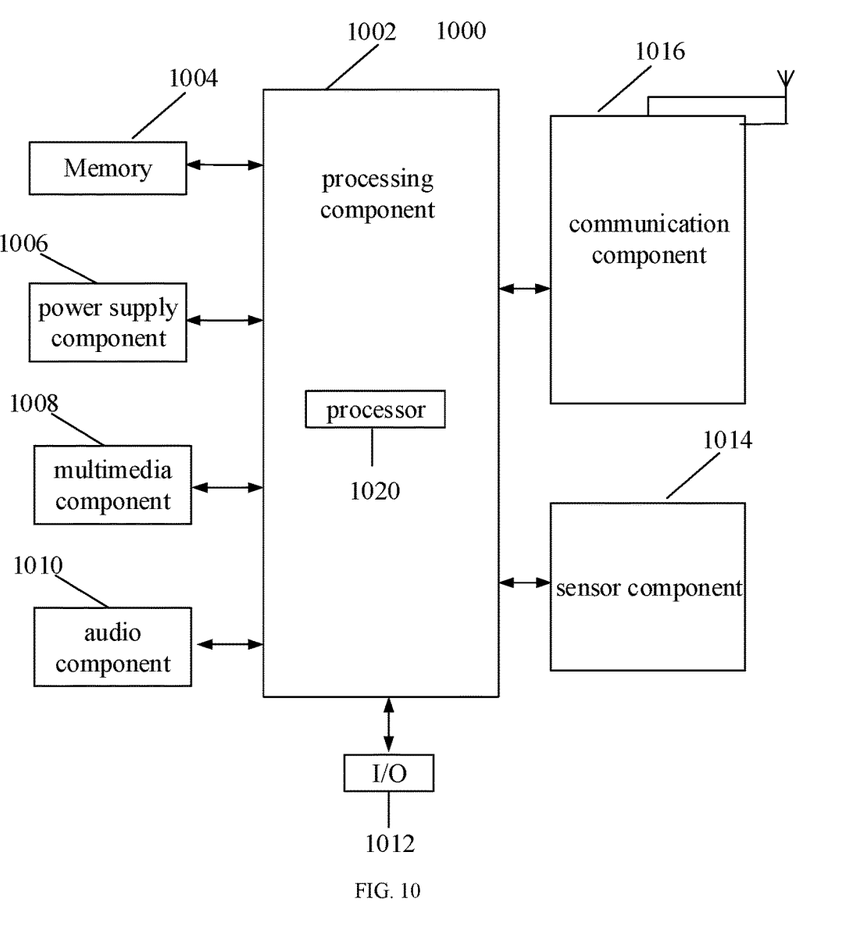
FIG. 10 is a structural diagram of an electronic device according to an example of the present disclosure.

FIG. 10 is a block diagram illustrating a device 1000 for split-screen display according to an example. For example, the apparatus 1000 may be a mobile phone, a computer, a digital broadcasting terminal, a messaging device, a game console, a tablet device, a medical equipment, a fitness equipment, a personal digital assistant, etc.

Referring to FIG. 10, the apparatus 1000 may include one or more components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the whole operation of the device 1000, such as the operations related to display, phone call, data communication, camera operation and recording operation. The processing component 1002 may include one or more processors 1020 to execute instructions to perform all or part of the steps in the described methods above. Moreover, the processing component 1002 may include one or more modules which facilitate the interaction between the processing component 1002 and other components. For example, the processing component 1002 may include a multimedia module for the convenience of interaction between the multimedia component 1008 and the processing component 1002.

The memory 1004 is configured to store all types of data to support the operation of the apparatus 1000. Examples of the data include the instructions of any applications or methods operated on the device 1000, contact data, phone book data, messages, pictures, videos, etc. The memory 1004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1006 may provide power supply for all components of the apparatus 1000. The power supply component 1006 may include power supply management system, one or more power supplies, and other units related to generating, managing and distributing power for the apparatus 1000.

The multimedia component 1008 includes an output interface screen provided between the device 1000 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia units 1008 include a front camera and/or a rear camera. When the apparatus 1000 is in operation mode, such as shooting mode or video mode, the front camera or the rear camera may receive the external multimedia data. Each of the front camera and the rear camera may be a fixed optical lens system or have focus and optical zoom capability.

The audio component 1010 is configured to output and/or input audio signals. For example, the audio component 1010 includes a microphone (MIC) configured to receive an external audio signal when the apparatus 1000 is in an operation mode, such as a call mode, a recording mode, and a voice recognition mode. The audio signals received may be further stored in the memory 1004 or sent via the communication component 1016. In some examples, the audio 1010 further includes a speaker, configured to output audio signals.

The I/O interface 1012 provides an interface for the processing component 1002 and the peripheral interface module, and the peripheral interface module may be a keyboard, a click wheel, a button, etc. The buttons may include but not limited to a home button, a volume button, a start button and a lock button.

The sensor component 1014 includes one or more sensors, configured to provide various aspects of status assessment for the device 1000. For example, the sensor component 1014 may detect the on/off state of the apparatus 1000 and the relative positioning of the component. For example, the component is a display and a keypad of the apparatus 1000. The sensor component 1014 may further detect the position change of the apparatus 1000 or one component of the apparatus 1000, the presence or absence of contact between the user and the apparatus 1000, the orientation or acceleration/deceleration of the apparatus 1000, and the temperature change of the apparatus 1000. The sensor component 1014 may include a proximity sensor, which is configured to detect the existence of the objects nearby without any physical contact. The sensor component 1014 may also include a light sensor, such as a CMOS or CCD image sensor, for use in imaging applications. In some examples, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the apparatus 1000 and other devices. The device 1000 may access wireless networks based on communication standard, such as WiFi, 2G, 3G, 4G, LTE or NR (New Radio), or their combination. In an illustrative example, the communication units 1016 receives broadcast signals or broadcast-related information from an external broadcast management system via a broadcast channel. In an illustrative example, the communication component 1016 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example, the apparatus 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the above method.

In an illustrative example, there is also provided a non-transitory computer readable storage medium including instructions, such as included in the memory 1004, executable by the processor 1020 in the apparatus 1000, for performing the above-described methods. For example, the non-transitory computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other examples of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and examples are merely illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

The above are only some examples in accordance with the present disclosure, and do not constitute the limitation of the present disclosure. Any modification, equivalent replacement, improvement, etc., made within the spirit and principle of embodiments of the present disclosure shall be included within the protection scope of examples of the present disclosure.

What is claimed is:

1. A method for split-screen display, comprising:
   displaying a first interface of a first application in a first split-screen area, displaying a second interface of a second application in a second split-screen area, in response to a start instruction for a split-screen function, wherein the second split-screen area is different from the first split-screen area;
   displaying a third interface in the second split-screen area, displaying the first interface of the first application in the first split-screen area, in response to a first operation on the second interface, wherein the third interface is independent from the second application; and
   creating a subsystem corresponding to the first split-screen area to run the first application, wherein the first application is running based on the subsystem created, the subsystem is a virtual system created in a main system, and the main system is an operating system mounted on an electronic device;
   wherein displaying the second interface of the second application in the second split-screen area comprises:
   running the second application based on a main system to display the second interface of the second application in the second split-screen area, wherein the second application is running on the main system without relying on a logic of the split-screen display embedded on the main system, and the first application displayed in the first split-screen area runs independently on the subsystem not subject to the logic of the split-screen.

2. The method of claim 1, wherein creating the subsystem corresponding to the first split-screen area to run the first application comprises:
   running the first application in the subsystem in response to the start instruction for the first application; or
   switching the first application running on a main system to the subsystem, in response to the subsystem being created.

3. The method of claim 1, wherein creating the subsystem corresponding to the first split-screen area comprises:
   creating independent subsystems for M split-screen areas, in response to altogether N split-screen areas, wherein the M split-screen areas comprise the first split-screen area, the M split-screen areas do not include the second split-screen area, and N, M are positive integers, N≥2, N>M≥1;
   wherein, each subsystem is configured to run an application individually, and interfaces of running applications are displayed in the M split-screen areas correspondingly.

4. The method of claim 1, further comprising:
   adding a lock identification to the first split-screen area displaying the first interface of the first application, to make the subsystem only run the first application.

5. The method of claim 1, further comprising:
   determining that the start instruction for the split-screen function is detected, in response to a start widget of the split-screen function displayed being triggered; or
   determining that the start instruction for the split-screen function is detected, in response to a second operation being detected.

6. The method of claim 5, wherein the second operation comprises at least one of:
   a preset floating gesture operation, a sliding operation along a preset track or a click operation in a preset form.

7. The method of claim 1, further comprising:
   exchanging positions of the first split-screen area and the second split-screen area, in response to receiving an exchange instruction to change positions of the first split-screen area and the second split-screen area.

8. The method of claim 1, further comprising:
   displaying a prompt for the split-screen area corresponding to an input widget, in response to the input widget being displayed.

9. The method of claim 1, further comprising:
   closing the second application displayed in the second split-screen area;
   returning the second split-screen area to a state of displaying icons; and
   displaying the first split-screen area the first interface of the first application.

10. An electronic device, comprising:
    a processor; and
    a memory storing instructions when executed by the processor causes the processor to;
    wherein the processor is configured to:
    display a first interface of a first application in a first split-screen area, display a second interface of a second application in a second split-screen area, in response to a start instruction for a split-screen function, wherein the second split-screen area is different from the first split-screen area;
    display a third interface in the second split-screen area, displaying the first interface of the first application in the first split-screen area, in response to a first operation on the second interface, wherein the third interface is independent from the second application;

create a subsystem corresponding to the first split-screen area to run the first application, wherein the first application is running based on the subsystem created, the subsystem is a virtual system created in a main system, and the main system is an operating system mounted on the electronic device; and run the second application based on a main system to display the second interface of the second application in the second split-screen area, wherein the second application is running on the main system without relying on a logic of the split-screen display embedded on the main system, and the first application displayed in the first split-screen area runs independently on the subsystem not subject to the logic of the split-screen.

11. The electronic device of claim 10, wherein the processor is further configured to:

run the first application in the subsystem in response to the start instruction for the first application; or switch the first application running on a main system to the subsystem, in response to the subsystem being created.

12. The electronic device of claim 10, wherein the processor is further configured to:

create independent subsystems for M split-screen areas, in response to altogether N split-screen areas, wherein the M split-screen areas comprise the first split-screen area, the M split-screen areas do not include the second split-screen area, and N, M are positive integers, N≥2, N>M≥1;

wherein, each subsystem is configured to run an application individually, and interfaces of running applications are displayed in the M split-screen areas correspondingly.

13. The electronic device of claim 10, wherein the processor is further configured to:

add a lock identification to the first split-screen area displaying the first interface of the first application, to make the subsystem only run the first application.

14. The electronic device of claim 10, wherein the processor is further configured to:

determine that the start instruction for the split-screen function is detected, in response to a start widget of the split-screen function displayed being triggered; or determine that the start instruction for the split-screen function is detected, in response to a second operation being detected.

15. The electronic device of claim 10, wherein the processor is further configured to:

exchange positions of the first split-screen area and the second split-screen area, in response to receiving an exchange instruction to change positions of the first split-screen area and the second split-screen area.

16. The electronic device of claim 10, wherein the processor is further configured to:

display a prompt for the split-screen area corresponding to an input widget, in response to the input widget being displayed.

17. A non-transitory computer-readable storage medium having stored therein instructions that, when executed by a processor of a mobile terminal, causes the mobile terminal to perform a method for split-screen display, the method comprising:

displaying a first interface of a first application in a first split-screen area, displaying a second interface of a second application in a second split-screen area, in response to a start instruction for a split-screen function, wherein the second split-screen area is different from the first split-screen area;

displaying a third interface in the second split-screen area, displaying the first interface of the first application in the first split-screen area, in response to a first operation on the second interface, wherein the third interface is independent from the second application; and creating a subsystem corresponding to the first split-screen area to run the first application, wherein the first application is running based on the subsystem created, the subsystem is a virtual system created in a main system, and the main system is an operating system mounted on an electronic device;

wherein displaying the second interface of the second application in the second split-screen area comprises:

running the second application based on a main system to display the second interface of the second application in the second split-screen area, wherein the second application is running on the main system without relying on a logic of the split-screen display embedded on the main system, and the first application displayed in the first split-screen area runs independently on the subsystem not subject to the logic of the split-screen.

* * * * *